United States Patent [19]
Omura

[11] Patent Number: 5,877,900
[45] Date of Patent: Mar. 2, 1999

[54] EYEPIECE WITH WIDE FIELD OF VIEW

[75] Inventor: Yasuhiro Omura, Tokyo, Japan

[73] Assignee: Nikon Corporation, Tokyo, Japan

[21] Appl. No.: 815,350

[22] Filed: Mar. 10, 1997

[30] Foreign Application Priority Data

Mar. 14, 1996 [JP] Japan .................................. 8-085702

[51] Int. Cl.⁶ .................................................. G02B 25/00
[52] U.S. Cl. ........................... 359/644; 359/643; 359/644
[58] Field of Search ..................... 359/643, 644, 359/645, 646

[56] References Cited

U.S. PATENT DOCUMENTS 5,270,860  12/1993  Suzuki ................................... 359/660

FOREIGN PATENT DOCUMENTS

| 6-148534 | 5/1994 | Japan . |
| 6-175045 | 6/1994 | Japan . |
| 6-194583 | 7/1994 | Japan . |
| 7-84195  | 3/1995 | Japan . |

Primary Examiner—Georgia Epps
Assistant Examiner—Michael A. Lucas
Attorney, Agent, or Firm—Chapman & Cutler

[57] ABSTRACT

An eyepiece includes a biconvex lens, a bonded negative meniscus lens including a negative lens with a concave surface which faces the object, and a positive lens having a convex surface which faces an eyepoint. A biconvex lens and a positive lens having a convex surface which faces the object are also provided. Certain prescribed conditional equations are met by the eyepiece.

20 Claims, 10 Drawing Sheets

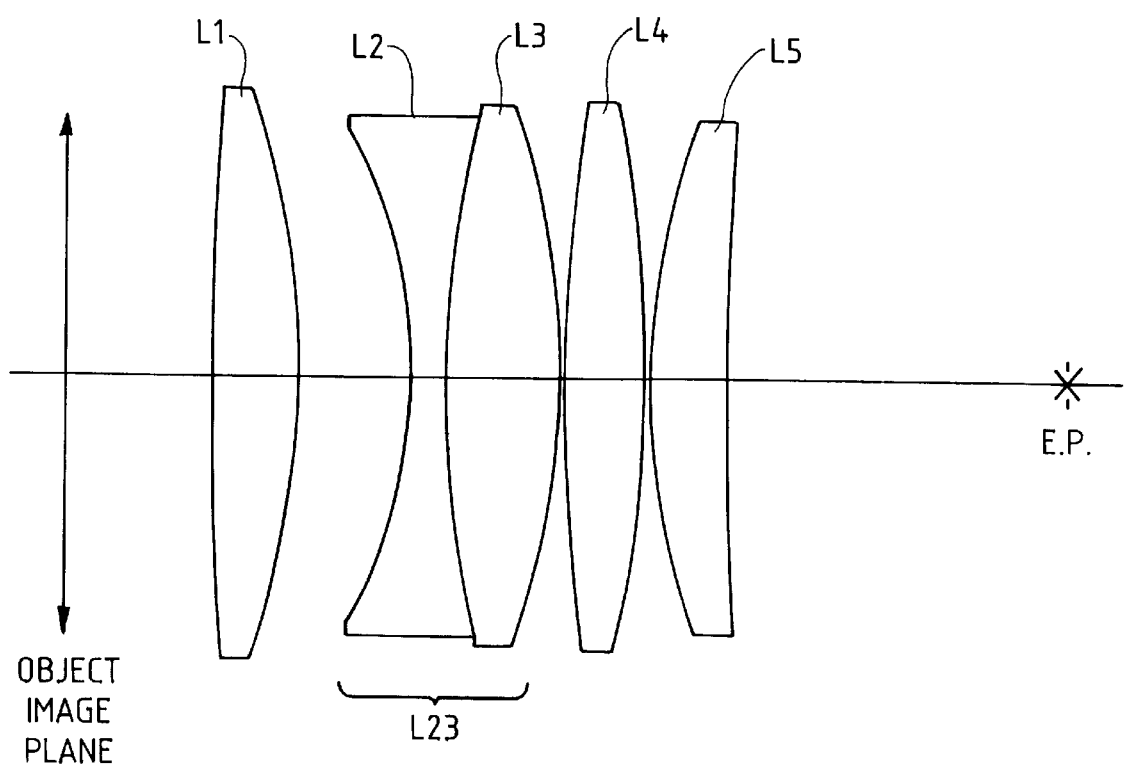

H = 12.5 (FN=1.1)

SPHERICAL ABERRATION OF PUPIL

Y = 12.5

ASTIGMATIC ABERRATION

DISTORTION ABERRATION

CHROMATIC MAGNIFICATION ABERRATION

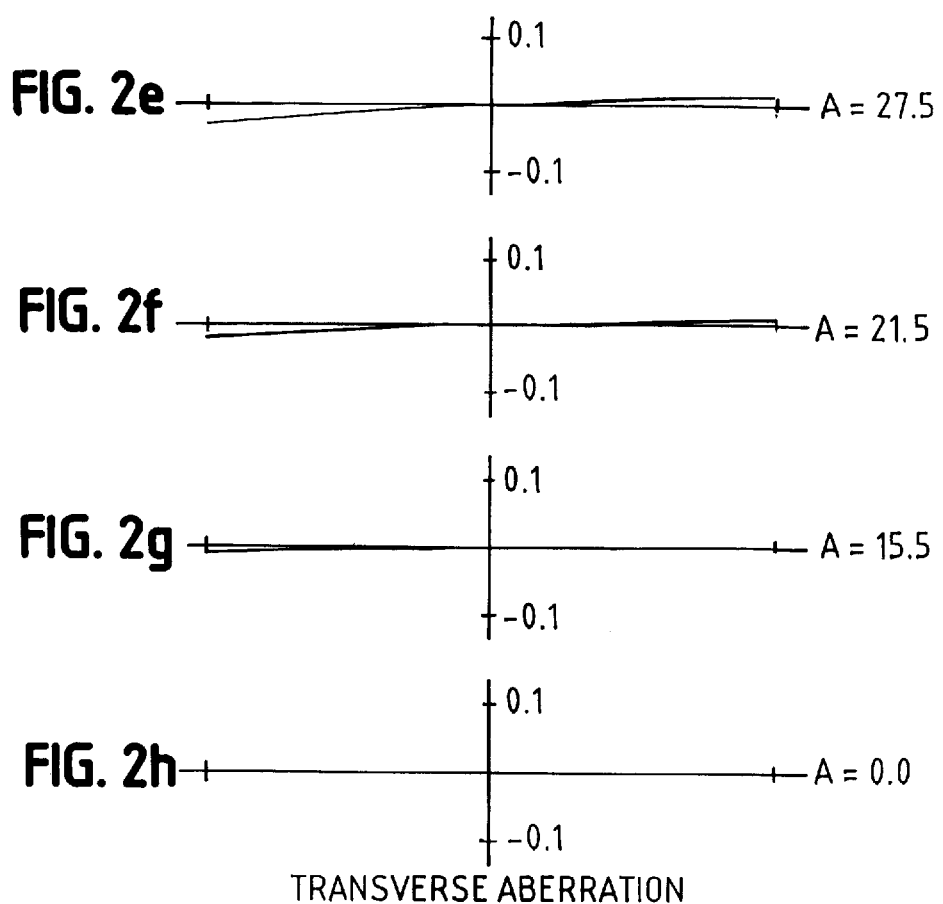

A = 27.5

A = 21.4

A = 15.5

A = 0.0

TRANSVERSE ABERRATION

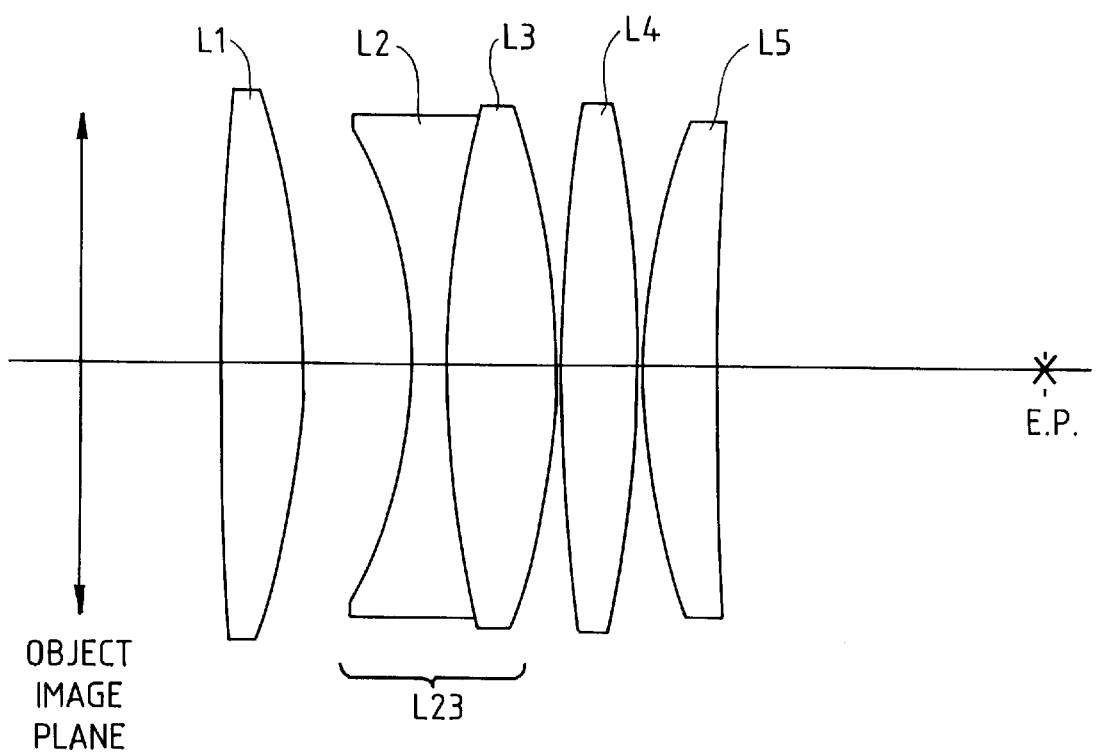

H = 12.5 (FN=1.1)

SPHERICAL ABERRATION
OF PUPIL

Y = 12.5

ASTIGMATIC ABERRATION

DISTORTION
ABERRATION

CHROMATIC
MAGNIFICATION
ABERRATION

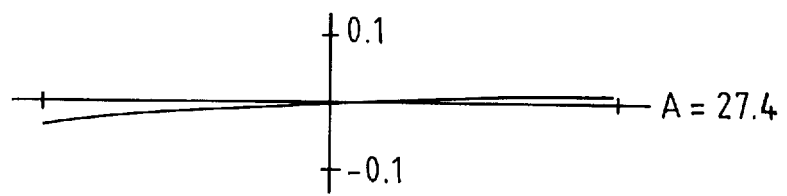
FIG. 5e  A = 27.4
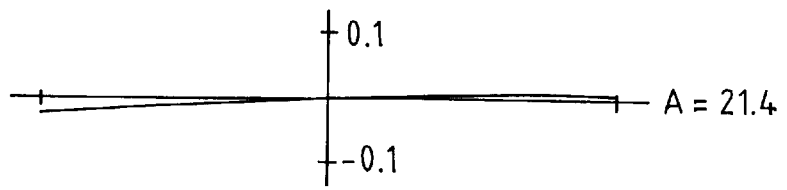
FIG. 5f  A = 21.4
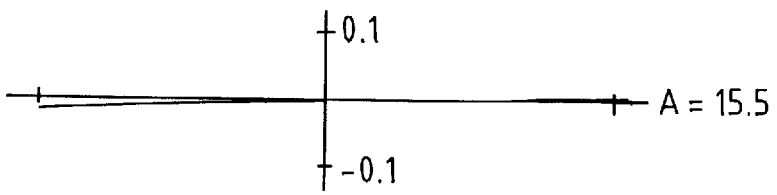
FIG. 5g  A = 15.5
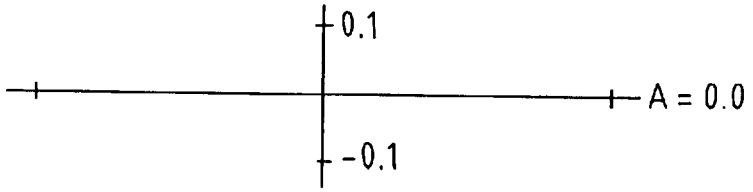
FIG. 5h  A = 0.0
TRANSVERSE ABERRATION

H = 12.5 (FN=1.1)

SPHERICAL ABERRATION
OF PUPIL

Y = 12.5

ASTIGMATIC ABERRATION

DISTORTION
ABERRATION

CHROMATIC
MAGNIFICATION
ABERRATION

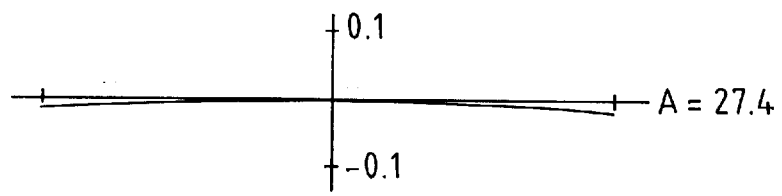
FIG. 6e  A = 27.4
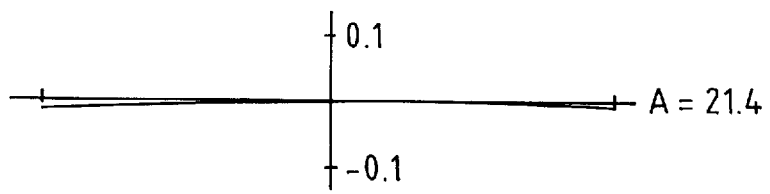
FIG. 6f  A = 21.4
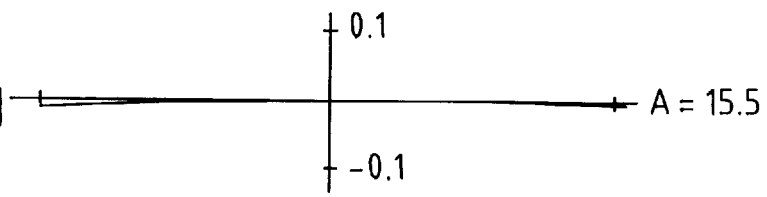
FIG. 6g  A = 15.5
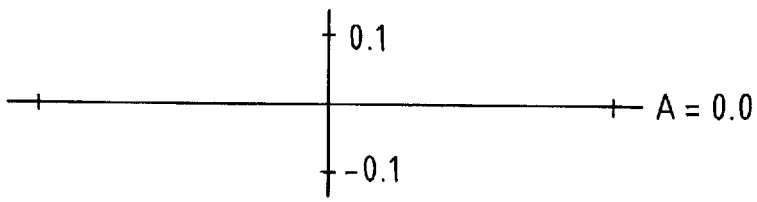
FIG. 6h  A = 0.0
TRANSVERSE ABERRATION

EYEPIECE WITH WIDE FIELD OF VIEW

BACKGROUND OF THE INVENTION

1. Field of the Invention

The present invention pertains to an eyepiece with a wide angle lens and, more specifically, to an eyepiece with a wide field of view which is used in microscopes and similar devices.

2. Description of Related Art

Many suggestions have been made for improving an eyepiece used in microscopes and similar devices. One recent suggestion relates to broadening the field of view of an eyepiece. A suggestion has also been made to increase an on-axis distance between a surface of the pupil of the ocular system and the eyepoint. This on-axis distance is referred to as "eye relief". When securing a wide field of view and an eye relief of substantial length, aberrations such as distortion aberration, astigmatism, and spherical aberration of the pupil tend to increase. Conventional eyepieces with wide fields of view for correcting these aberrations are disclosed, for example, in Japanese Kokai Patent Application Nos. Hei 6[1994]-148543, Hei 6[1994]-175045, Hei 6[1994]-194583, and Hei 7[1995]-84195.

SUMMARY OF THE INVENTION

It is generally necessary, for aberration correction in an eyepiece, to compensate for both an aberration in an object image surface when light is incident from an eyepoint (observation side) and an aberration in the eyepoint position (observation point) when light is incident from the object image surface (object side). In other words, compensation must be provided for both an intrinsic aberration of the eyepiece and an aberration of the pupil. The incident pupil position of the eyepiece, moreover, is altered by changing the optical system interposed in the optical path between the object lens and the eyepiece. It is necessary to compensate or correct for the aberration of the eyepiece so that the aberration variation of the eyepiece due to a change in the incident pupil position can be sufficiently suppressed.

The intrinsic aberration of the eyepiece, the aberration of the pupil, and the aberration variation due to the change in the incident pupil position are interrelated. Individual aberrations, therefore, cannot be corrected independently of the others. In practice, in a conventional eyepiece, with a wide field of view and formed from only 5 spherical lenses or so, individual aberrations cannot be corrected.

If an optical system is complicated by an increase in the number of lenses in order to correct for individual aberrations, then the generation of flare or other types of stray light due to reflection at the lens surface is increased. The contrast of the observation image is markedly reduced in this situation.

In what is known as an intermediate imaging type of eyepiece, an object image is formed between two lenses in the eyepiece. It is known that, in such an eyepiece, the correction of individual aberrations is relatively easy. However, since various types of masks (for example, a mask in which grids are formed) are now used to locate the positions at which the object image is formed, the intermediate imaging type of eyepiece is not appropriate. Also, in the intermediate imaging type of eyepiece, an increase in the number of lenses utilized cannot be avoided.

A method for favorably correcting aberrations by forming a lens surface of the eyepiece in an aspheric shape has also been considered. However, in this case, the manufacturing costs are greatly increased by the introduction of the aspheric lens.

One object of the present invention is to provide an eyepiece with a wide field of view which is formed from only a few spherical lenses, in which the viewing angle and the eye relief are large, and in which intrinsic aberrations such as distortion aberration and astigmatism, the aberration of the pupil, and the aberration variation due to a change in the incident pupil position are favorably corrected.

According to the present invention, an eyepiece with a wide field of view is provided and includes particular lenses, the surfaces of which are all spherical in form. Specifically, the eyepiece includes, in order from an object side, a biconvex lens, a bonded negative meniscus lens including a negative lens with a concave surface facing the object side and positive lens with a convex surface facing an eyepoint side, a biconvex lens, and a positive lens with a convex surface facing the object side. Assuming the eyepoint-side surface of the biconvex lens to have a radius of curvature of r2, the object-side surface of the negative lens L2 to have a radius of curvature r3, the on-axis distance between the biconvex lens L1 and the bonded negative meniscus lens L23 to be d2, the refractive index of the biconvex lens L1 with respect to what is referred to as a "d-line" to be n1, and the refractive index of the negative lens L2 with respect to the d-line to be n2, the following conditions are met:

$$0.04 < (n2-1)d2/|r3| - (n1-1)d2/|r2| < 0.2$$

$$0.3 < d2(1/|r2| + 1/|r3|) < 0.5$$

According to a preferred embodiment of the invention, when the focal distance of the positive lens L5 mentioned above, the focal distance of the entire eyepiece system, and the axial thickness of the positive lens L5 mentioned above are f5, F, and d8, respectively, the condition $0.1 < d8 \cdot f5/F^2 < 1.8$ is met.

BRIEF DESCRIPTION OF THE DRAWINGS

FIG. 1 shows a lens construction of an eyepiece with a wide field of view which forms a first embodiment of the present invention.

FIG. 2a–2h shows aberration diagrams resulting when the incident pupil position is oriented toward an object side of the eyepiece and at infinity according to the first embodiment.

FIG. 4 shows a lens construction similar to FIG. 1 but according to a second embodiment of the present invention.

FIG. 5a–5h shows aberration diagrams similar to those shown in FIG. 2a–2h but according to the second embodiment.

FIG. 6a–6h shows aberration diagrams similar to those shown in FIG. 3a–3h but according to the second embodiment.

DESCRIPTION OF THE PREFERRED EMBODIMENTS

Figure 2A:
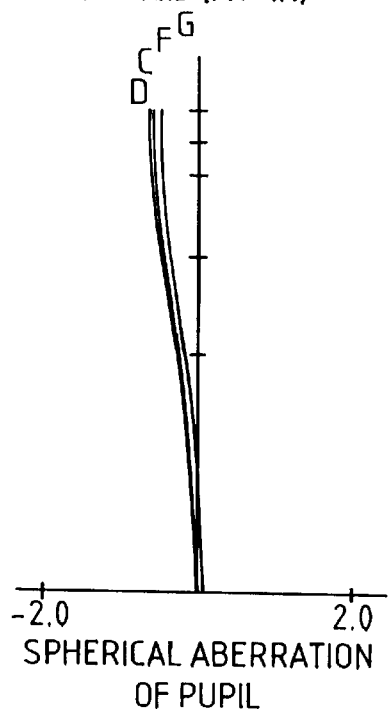

In general, if distortion aberration is corrected in an eyepiece which is formed from only spherical lenses, then a lens surface M having a strong negative refractive power is required. Also, considering the influence on other aberration types and in order to secure an eye relief of sufficient length, the lens surface M is preferably located at the object side. It is also preferable for a concave surface of the lens surface M to face the object in order to provide proper correction for coma or transverse aberration and the curvature of the image plane. Aberrations such as distortion aberration, coma aberration, and curvature of the image plane are favorably corrected by providing a strong negative refractive power to the concave surface of the object side of a negative lens L2. At the same time, long eye relief is secured.

An increase in the lens diameter is avoided by installing, in order from an object side of the eyepiece, a biconvex lens L1 and a negative lens L2. A concave surface of the negative lens L2 faces the object. However, if chromatic aberration is corrected only by the biconvex lens L1 and the negative lens L2, then a high-order chromatic magnification aberration is generated. The chromatic aberration of the pupil (the change in the spherical aberration of the pupil relative to a light wavelength change) is also overcorrected. Thus, in the present invention, the chromatic aberration is favorably corrected by attaching the negative lens L2, having a concave surface which faces the object, and a positive lens L3, having a convex surface which faces the eyepoint. An eye relief of substantial length is secured while favorably correcting each aberration by arranging a biconvex lens L4 and a positive lens L5, having a convex surface which faces the object, at the eyepoint side of the positive lens L3.

Various conditional equations associated with the present invention will now be explained.

An eyepiece with a wide field of view according to the present invention will meet conditional equations (1) and (2):

$$0.04 < (n2-1)d2/|r3| - (n1-1)d2/|r2| < 0.2; \text{ and} \quad (1)$$

$$0.3 < d2(1/|r2| + 1/|r3|) < 0.5 \quad (2)$$

In conditional equations (1) and (2), r2 is a radius of curvature of an eyepoint-side surface of the biconvex lens L1;

r3 is a radius of curvature of an object-side surface of the negative lens L2;

d2 is an on-axis distance between the biconvex lens L1 mentioned above and a bonded negative meniscus lens L23;

n1 is a refractive index for a "d-line" ($\lambda$=587.6 nm) of the biconvex lens L1; and n2 is a refractive index for the d-line of the negative lens L2 mentioned above.

Conditional equation (1) is a conditional equation for favorably compensating for distortion aberration, coma aberration, and curvature of the image plane.

When the upper limit of conditional equation (1) is exceeded, high-order distortion aberration is generated, and the distortion of the image can be clearly seen at a peripheral part of the visual field.

On the other hand, below the lower limit of conditional equation (1), correction for the distortion aberration and the coma aberration is deficient. Also, the Petzval sum cannot approach 0, and correction for the curvature of the image plane is difficult.

If the upper limit and the lower limit are respectively set to 0.1 and 0.06 in conditional equation (1), then a favorable aberration correction is enabled.

Conditional equation (2) specifies the conditions for favorably compensating for the distortion aberration, the coma aberration, and the spherical aberration of the pupil.

When the upper limit of conditional equation (2) is exceeded, high-order distortion aberration and spherical aberration of the pupil are generated. Distortion of the image can be clearly seen at the peripheral part of the visual field. At the same time, vignetting (blocking of light) is generated in light at the peripheral part of the visual field, so that it is difficult to simultaneously observe the entire visual field.

Below the lower limit of conditional equation (2), correction of the distortion aberration and the coma aberration is deficient.

If the upper limit and the lower limit are respectively set to 0.45 and 0.4 in conditional equation (2), then an even more favorable aberration correction is enabled.

In order to secure an eye relief of sufficient length and to compensate for the coma aberration, it is desirable to meet the following conditional equation (3).

$$0.1 < d8 - f5/F^2 < 1.8 \quad (3)$$

In conditional equation (3), f5 is a focal distance of the positive lens L5;

F is a focal distance of the entire eyepiece system; and d8 is an on-axis thickness of the positive lens L5.

The on-axis thickness of the positive lens L5 is the distance along the optical axis between an object-side surface and an image-side surface of the positive lens L5.

Above the upper limit of conditional equation (3), it is difficult to secure an eye relief of sufficient length.

Below the lower limit of conditional equation (3), it is difficult to correct for the coma aberration.

The upper limit and the lower limit are preferably set to 1.0 and 0.2, respectively, in conditional equation (3).

The positive lens L5 is either a plano-convex lens having a planar surface which faces the eyepoint or a positive meniscus lens having a concave surface which faces the eyepoint. It is desirable for the eyepiece to meet the following conditional equation (4).

$$0 < de/|r9| < 0.18 \quad (4)$$

In conditional equation (4), r9 is a radius of curvature of the eyepoint-side surface of the positive lens L5; and de is an eye relief when the incident pupil position is oriented toward the object side of the eyepiece and at infinity.

Conditional equation (4) specifies a condition for securing an eye relief of sufficient length, favorably compensating for the coma aberration, and reducing the influence of peripheral light (external light) on the observation.

Above the upper limit of conditional equation (4), it is difficult to correct for the coma aberration.

Below the lower limit of conditional equation (4), peripheral light reflected on the surface at the eyepoint side of the positive lens L5 tends to enter the observer's eye and observation becomes difficult.

The upper limit and lower limit are preferably set to 0.12 and 0.03, respectively, in conditional equation (4).

According to the present invention, it is desirable to also meet the following conditional equations (5) and (6).

$$1.6 < r2/r3 < 2.0; \text{ and} \quad (5)$$

$$0 < r1/r9 < 0.9. \quad (6)$$

In equation (6), r1 is the radius of curvature of the object-side surface of the biconvex lens L1.

Conditional equation (5) specifies a condition for favorably compensating for the spherical aberration, the distortion aberration, and the astigmatic aberration.

When the upper limit of conditional equation (5) is exceeded, the spherical aberration of the pupil is overcorrected.

Below the lower limit of conditional equation (5), however, it is difficult to correct for high-order astigmatic aberration and distortion aberration.

If the upper limit and the lower limit are respectively set to 1.8 and 1.67 in conditional equation (5), then a more favorable aberration correction is enabled.

Conditional equation (6) specifies a condition for favorably compensating for the coma aberration and the curvature of the image plane.

If the upper limit of conditional equation (6) is exceeded, then correction for the coma aberration is difficult.

On the other hand, below the lower limit of conditional equation (6), correction for curvature of the image plane is difficult.

In conditional equation (6), if the upper limit and the lower limit are respectively set to 0.85 and 0.3, then an even more favorable aberration correction is provided.

In each embodiment of the invention, the eyepiece has a wide field of view and includes, in order from a side of the eyepiece facing the object, a biconvex lens L1, a bonded negative meniscus lens L23 made up of a negative lens L2 with a concave surface which faces the object and a positive lens L3 having a convex surface which faces the eyepoint, a biconvex lens L4, and a positive lens L5 with a convex surface which faces the object.

FIG. 1 shows a lens construction according to a first embodiment of the present invention.

The eyepiece shown in FIG. 1 includes a biconvex lens L1, a bonded negative meniscus lens L23 having a biconcave lens L2 and a biconvex lens L3, a biconvex lens L4, and a positive meniscus lens L5 with a convex surface which faces the object. Also, in FIG. 1, E.P. designates the eyepoint.

Various parameters of the first embodiment are shown in Table I. In Table I, F represents the focal distance, in mm, of the entire eyepiece lens, 2A represents the viewing angle or field of view, de represents an eye relief, in mm, when the incident pupil position is oriented toward an object side and at infinity, and D0 represents the distance, in mm, along the optical axis between the object image plane and the surface of the biconvex lens L1 which faces the object. The ordinal numbers on the left of Table I represent the sequence of each lens surface from the object side, and r represents the radius of curvature, in mm, of each lens surface. The letter d represents the distance, in mm, between each lens surface. The letter n and the character ν respectively represent the refractive index and Abbe number with respect to the d-line (λ=587.6 nm).

TABLE I

F = 25.00
2A = 55°
de = 19
D0 = 8.0

|   | r | d | n | ν |
|---|---|---|---|---|
| 1 | 211.85 | 4.5 | 1.79631 | 40.9 |
| 2 | −38.49 | 6.2 | | |
| 3 | −22.09 | 2.0 | 1.80518 | 25.4 |
| 4 | 45.69 | 6.5 | 1.51680 | 64.1 |
| 5 | −33.56 | 0.2 | | |
| 6 | 85.17 | 4.5 | 1.71300 | 53.9 |
| 7 | −51.09 | 0.2 | | |
| 8 | 32.31 | 4.5 | 1.74810 | 52.3 |
| 9 | 303.97 | | | |

TABLE I-continued

F = 25.00
2A = 55°
de = 19
D0 = 8.0

Values corresponding to above conditions

| f5 = 48.0 mm | | |
|---|---|---|
| (1) $|(n2 - 1)d2/|r3| - (n1 - 1)d2/|r2||$ | = | 0.09772 |
| (2) $d2(1/|r2| + 1/|r3|)$ | = | 0.44175 |
| (3) $d8 \cdot f5/F^2$ | = | 0.3456 |
| (4) $de/|r9|$ | = | 0.06251 |
| (5) r2/r3 | = | 1.74242 |
| (6) r1/r9 | = | 0.69694 |

Figure 2B:
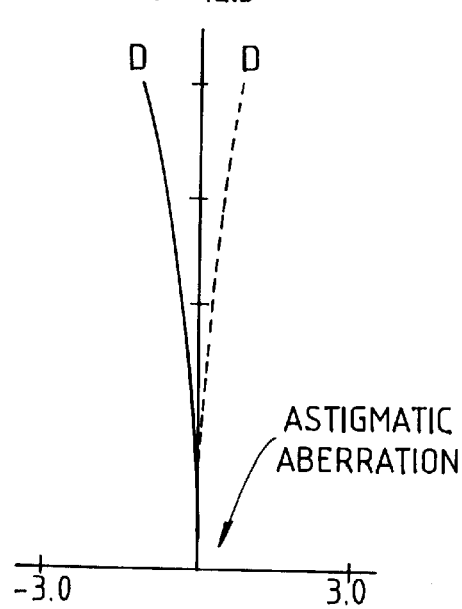
Figure 2C:
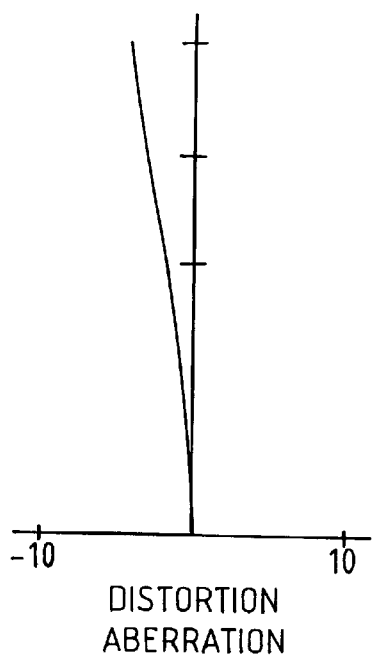
Figure 2D:
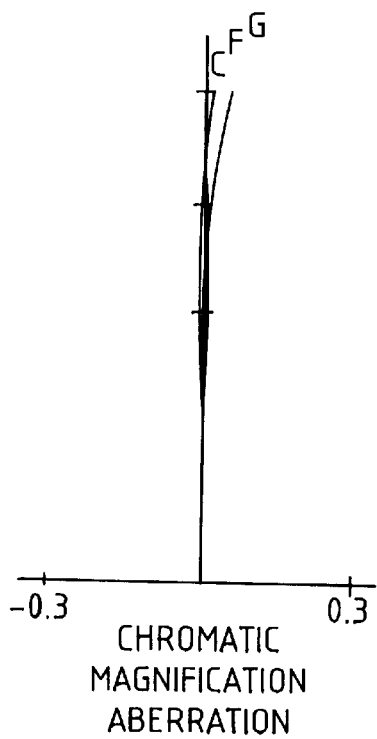
Figure 3A:
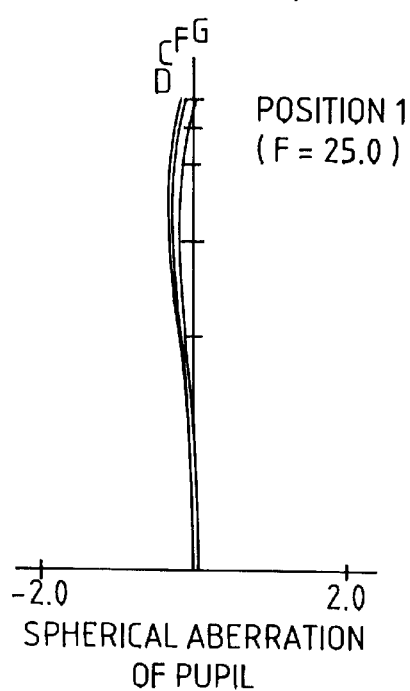
FIG. 3a–3h shows aberration diagrams resulting when the incident pupil position is oriented toward the object side of the eyepiece and at 350 mm from the surface of the biconvex lens facing the object according to the first embodiment.
Figure 3B:
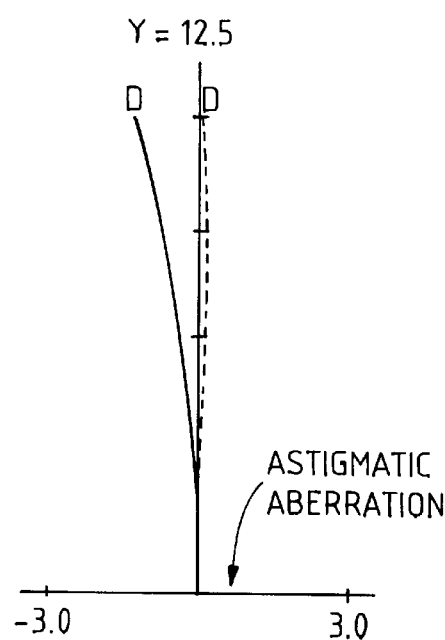
Figure 3C:
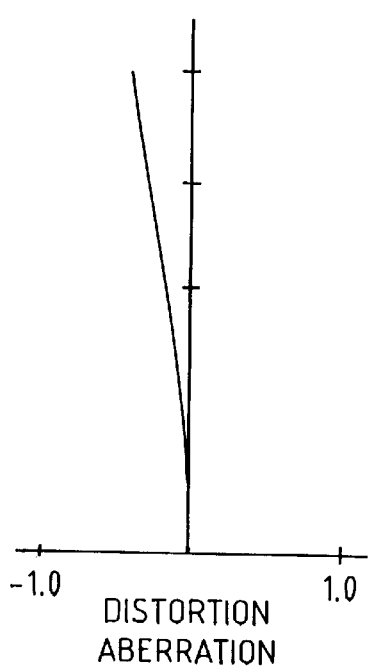
Figure 3D:
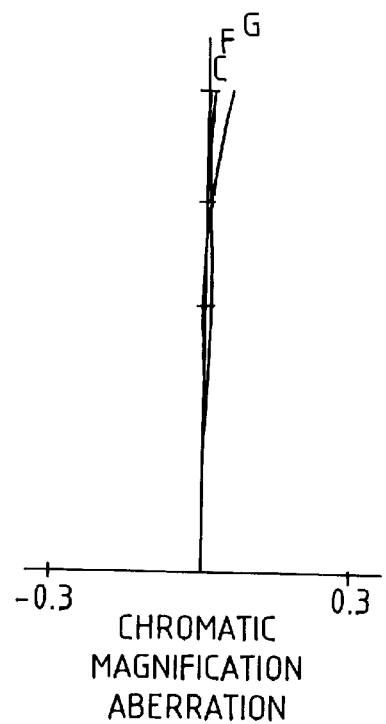
Figure 3E:
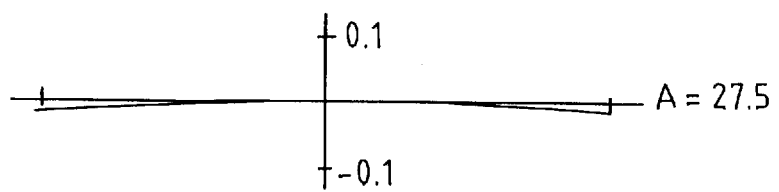
Figure 3F:
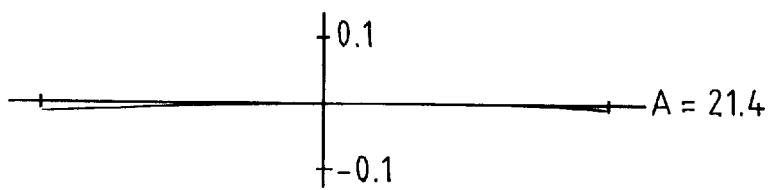
Figure 3G:
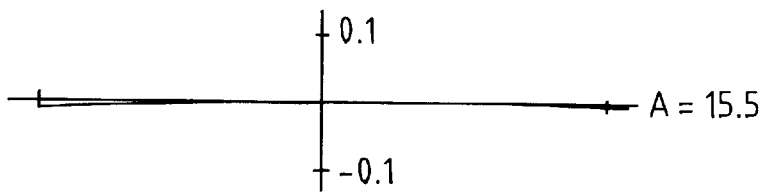
Figure 3H:
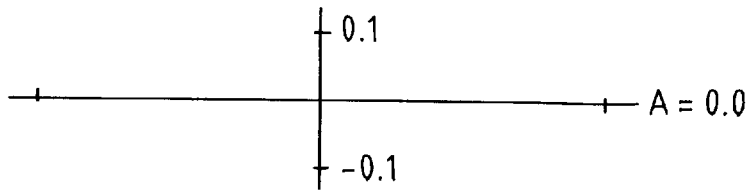

FIGS. 2 and 3 are aberration diagrams associated with the first embodiment. FIG. 2 is an aberration diagram resulting when the incident pupil position is oriented toward the object side and at infinity. FIG. 3 is an aberration diagram resulting when the incident pupil position is oriented toward the object side and at 350 mm from the object-side surface of the biconvex lens L1. Astigmatic aberration, distortion aberration, coma or transverse aberration, and chromatic magnification aberration are aberrations on the object image plane when a ray is traced from the eyepoint. The spherical aberration of the pupil is an aberration at the eyepoint position when a ray is traced from the object image plane.

In each aberration diagram, FN represents the F number, and H represents the incident pupil height in mm. Y represents the image height in mm, A represents the half-angle value, in degrees, of the field of view, and D represents the d-line (λ=587.6 nm). C represents the C-line (λ=656.3 nm), and F represents the F-line (λ=486.1 nm). G represents the g-line (λ=435.8 nm). In the aberration diagram showing astigmatic aberration, the solid lines represent the sagittal image plane and the broken lines represent the meridional image plane.

In this embodiment, aberration is favorably corrected up to the periphery of the field of view while securing a wide field of view and an eye relief of substantial length. A viewing angle of 55° is provided. By comparing FIGS. 2 and 3, it is seen that the aberration variation due to a change in the incident pupil position is favorably suppressed.

FIG. 4 shows a lens construction according to a second embodiment of the present invention.

The eyepiece illustrated in FIG. 4 includes a biconvex lens L1, a bonded negative meniscus lens L23 formed by a biconcave lens L2 and a biconvex lens L3, a biconvex lens L4, and a positive meniscus lens L5 having a convex surface which faces the object. E.P. represents the eyepoint in FIG. 4.

Various parameters of the second embodiment are shown in Table II. In Table II, F again represents the focal distance, in mm, of the entire eyepiece lens and 2A again represents the viewing angle or field of view. The reference character de represents the eye relief, in mm, when the incident pupil position is oriented toward the object side and at infinity, and D0 represents the distance, in mm, along the optical axis between the object image plane and the object-side surface of the biconvex lens L1. In Table II, the ordinal numbers on the left again represent the sequence of each lens surface from the object side, and r represents the radius of curvature, in mm, of each lens surface. The letter d represents the distance, in mm, between each lens surface. The letter n and the character ν respectively represent the refractive index and Abbe number with respect to the d-line (λ=587.6 nm).

TABLE II

F = 25.00
2A = 54.8°
de = 19
D0 = 8.1

|   | r       | d   | n       | v    |
|---|---------|-----|---------|------|
| 1 | 229.45  | 4.3 | 1.79631 | 40.9 |
| 2 | -37.48  | 6.1 |         |      |
| 3 | -21.76  | 1.9 | 1.80518 | 25.4 |
| 4 | 49.94   | 6.5 | 1.51860 | 70.0 |
| 5 | -33.31  | 0.2 |         |      |
| 6 | 92.80   | 4.5 | 1.74810 | 52.3 |
| 7 | -56.19  | 0.2 |         |      |
| 8 | 31.58   | 4.5 | 1.74810 | 52.3 |
| 9 | 297.96  |     |         |      |

Values corresponding to above conditions f5 = 46.9 mm
(1) $(n2 - 1) d2/|r3| - (n1 - 1) d2/|r2|$ = 0.09611
(2) $d2 (1/|r2| + 1/|r3|)$ = 0.44308
(3) $d8 \cdot f5/F^2$ = 0.33768
(4) $de/|r9|$ = 0.06377
(5) $r2/r3$ = 1.72243
(6) $r1/r9$ = 0.77007

Figure 5A:
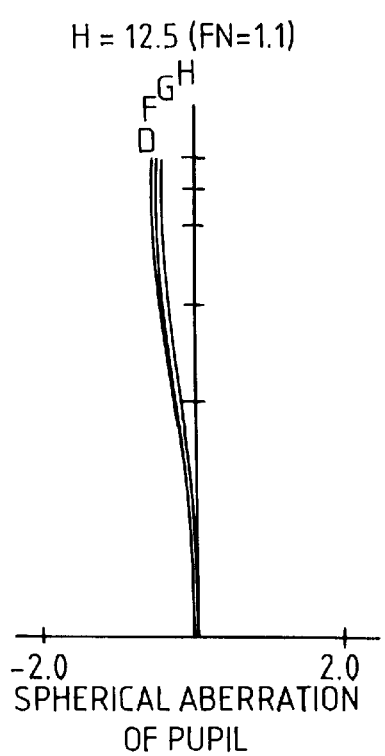
Figure 5B:
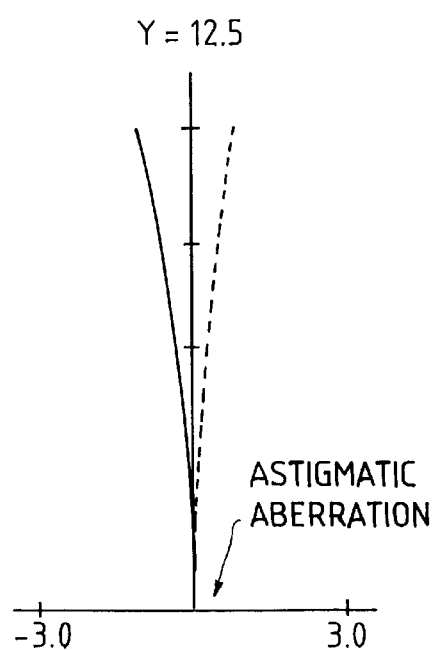
Figure 5C:
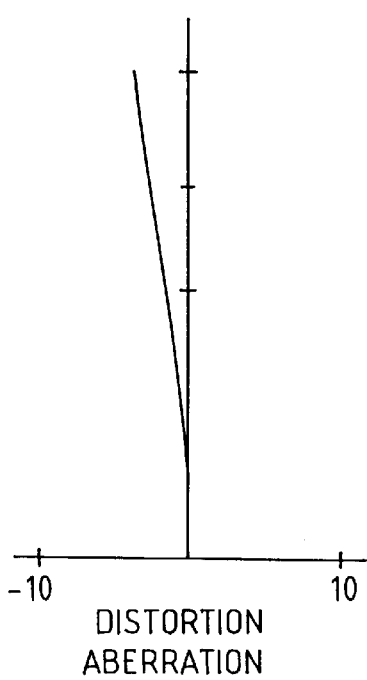
Figure 5D:
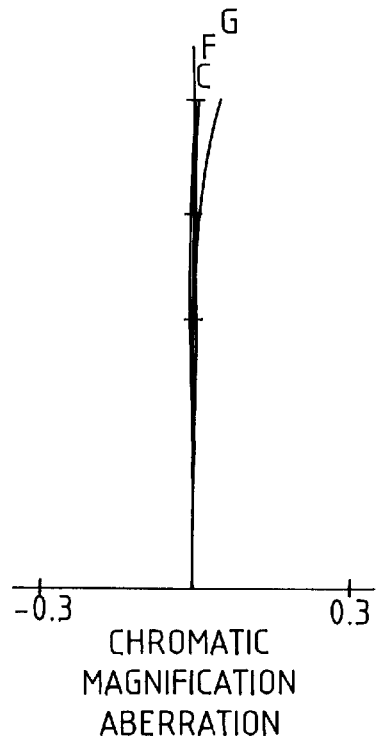
Figure 6A:
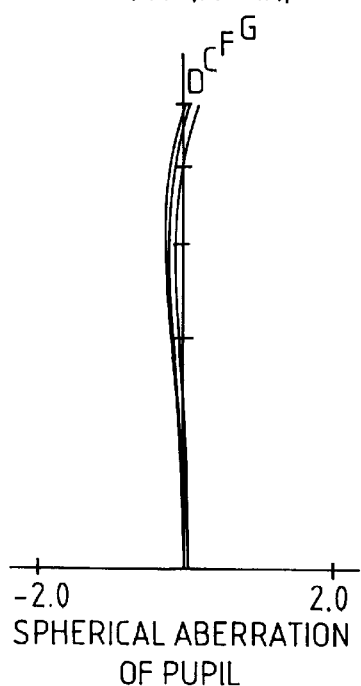
Figure 6B:
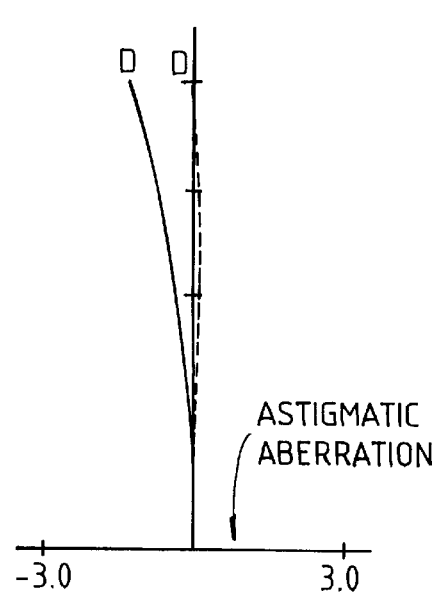
Figure 6C:
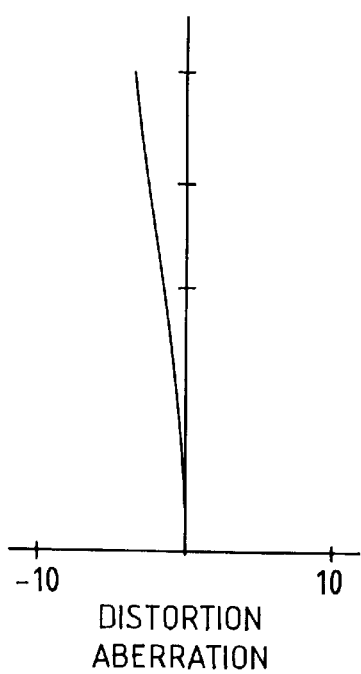
Figure 6D:
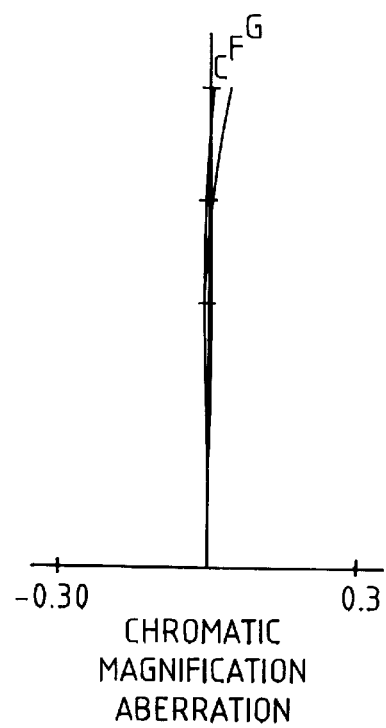

FIG. 5 and 6 are aberration diagrams associated with the second embodiment. FIG. 5 is an aberration diagram resulting when the incident pupil position is oriented toward the object side and at infinity. FIG. 6 is an aberration diagram resulting when the incident pupil position is oriented toward the object side and at 350 mm from the object-side surface of the biconvex lens L1. Astigmatic aberration, distortion aberration, coma or transverse aberration, and chromatic magnification aberration are aberrations on the object image plane when a ray is traced from the eyepoint. The spherical aberration of the pupil is an aberration at the eyepoint position when a ray is traced from the object image plane.

As noted in connection with the first embodiment, in each aberration diagram, FN represents the F number, and H represents the incident pupil height in mm. Y represents the image height in mm, A represents, in degrees, the half-angle value of the field of view, and D represents the d-line ($\lambda$=587.6 nm). C represents the C-line ($\lambda$=656.3 nm), and F represents the F-line ($\lambda$=486.1 nm). G represents the g-line ($\lambda$=435.8 nm). Also, in the aberration diagram showing astigmatic aberration, solid lines represent the sagittal image plane, and broken lines represent the meridional image plane.

As seen from each aberration diagram, in this embodiment, aberrations are favorably corrected up to the periphery of the field of view while securing a wide field of view and an eye relief of substantial length. A field of view of 54.8° is provided. It is seen from a comparison of FIGS. 5 and 6 that the aberration variation due to the change of the incident pupil position is favorably suppressed.

The present invention provides an eyepiece which is made up of only five spherical lenses and has a wide field of view and an eye relief of substantial length. Intrinsic aberrations such as distortion aberration, astigmatic aberration, aberration of the pupil, and aberration variation due to the change of the incident pupil position are favorably corrected.

I claim:

1. An eyepiece with a wide field of view comprising, in order from an object side of the eyepiece:

a first biconvex lens, a bonded negative meniscus lens having a negative lens with a concave surface facing the object side of the eyepiece and a first positive lens with a convex surface facing an eyepoint side of the eyepiece, a second biconvex lens, and a second positive lens with a convex surface facing the object side, said lenses having surfaces which are all spherical in form, wherein when an eyepoint-side surface of said first biconvex lens has a radius of curvature of r2, the concave surface of said negative lens has a radius of curvature r3, an on-axis distance between said first biconvex lens and said bonded negative meniscus lens is d2, a refractive index of said first biconvex lens with respect to a d-line is n1, and a refractive index of said negative lens with respect to the d-line is n2, the following conditions are met:

$$0.04 < (n2-1)d2/|r3| - (n1-1)d2/|r2| < 0.2;$$

and $$0.3 < d2(1/|r2| + 1/|r3|) < 0.5.$$

2. The eyepiece as defined in claim 1, wherein when a focal length of said second positive lens is f5, an overall focal length of the eyepiece is F, and an on-axis thickness of said second positive lens is d8, the following condition is met:

$$0.1 < d8 \cdot f5/F^2 < 1.8.$$

3. The eyepiece as defined in claim 1, wherein said second positive lens is a positive meniscus lens with a concave surface facing the eyepoint side of the eyepiece, and when a radius of curvature of said concave surface of said second positive lens is r9 and an eye relief is de when an incident pupil position is oriented toward the object side of the eyepiece and at infinity, the following condition is met:

$$0 < de/|r9| < 0.18.$$

4. The eyepiece as defined in claim 1, wherein when a radius of curvature of an object-side surface of said first biconvex lens is r1, the radius of curvature of the eyepoint-side surface of said first biconvex lens is r2, the radius of curvature of the concave surface of said negative lens is r3, and a radius of curvature of an eyepoint-side surface of said second positive lens is r9, the following conditions are met:

$$1.6 < r2/r3 < 2.0;$$

and $$0 < r1/r9 < 0.9.$$

5. The eyepiece as defined in claim 2, wherein said second positive lens is a positive meniscus lens, with a concave surface facing the eyepoint side of the eyepiece, and when a radius of curvature of said concave surface of said second positive lens is r9 and an eye relief is de when an incident pupil position is oriented toward the object side of the eyepiece and at infinity, the following condition is met:

$$0 < de/|r9| < 0.18.$$

6. The eyepiece as defined in claim 2, wherein when a radius of curvature of an object-side surface of said first biconvex lens is r1, the radius of curvature of the eyepoint-side surface of said first biconvex lens is r2, the radius of curvature of the concave surface of said negative lens is r3, and a radius of curvature of an eyepoint-side surface of said second positive lens is r9, the following conditions are met:

$$1.6 < r2/r3 < 2.0;$$

and $$0 < r1/r9 < 0.9.$$

7. The eyepiece as defined in claim 3, wherein when a radius of curvature of an object-side surface of said first biconvex lens is r1, the radius of curvature of the eyepoint-side surface of said first biconvex lens is r2, the radius of curvature of the concave surface of said negative lens is r3, and said radius of curvature of said concave surface of said second positive lens is r9, the following conditions are met:

$$1.6 < r2/r3 < 2.0;$$

and $$0 < r1/r9 < 0.9.$$

8. The eyepiece as defined in claim 1, wherein said second positive lens is a plano-convex lens with a planar surface facing the eyepoint side of the eyepiece.

9. The eyepiece as defined in claim 2, wherein said second positive lens is a plano-convex lens with a planar surface facing the eyepoint side of the eyepiece.

10. An eyepiece with a wide field of view comprising, at least 2 lenses in order from an object side to an eyepoint side of the eyepiece:

a biconvex lens, and a bonded negative meniscus lens including a negative lens with a concave surface facing said object side of the eyepiece;

said lenses having surfaces which are all spherical in form, wherein when an eyepoint-side surface of said biconvex lens has a radius of curvature of r2, the concave surface of said negative lens has a radius of curvature r3, an on-axis distance between said biconvex lens and said bonded negative meniscus lens is d2, a refractive index of said biconvex lens with respect to a d-line is n1, and a refractive index of said negative lens with respect to the d-line is n2, the following conditions are met:

$$0.04 < (n2-1)d2/|r3| - (n1-1)d2/|r2| < 0.2;$$

and $$0.3 < d2(1/|r2| + 1/|r3|) < 0.5.$$

11. The eyepiece as defined in claim 10, and further comprising a positive lens, wherein when a focal length of said positive lens is f5, an overall focal length of the eyepiece is F, and an on-axis thickness of said positive lens is d8, the following condition is met:

$$0.1 < d8 \cdot f5/F^2 < 1.8.$$

12. The eyepiece as defined in claim 10, and further comprising a positive meniscus lens with a concave surface facing the eyepoint side of the eyepiece, wherein when a radius of curvature of said concave surface of said positive meniscus lens is r9 and an eye relief is de when an incident pupil position is oriented toward the object side of the eyepiece and at infinity, the following condition is met:

$$0 < de/|r9| < 0.18.$$

13. The eyepiece as defined in claim 10, and further comprising a positive lens, wherein when a radius of curvature of an object-side surface of said biconvex lens is r1, the radius of curvature of the eyepoint-side surface of said biconvex lens is r2, the radius of curvature of the concave surface of said negative lens is r3, and a radius of curvature of an eyepoint-side surface of said positive lens is r9, the following conditions are met:

$$1.6 < r2/r3 < 2.0;$$

and $$0 < r1/r9 < 0.9.$$

14. The eyepiece as defined in claim 11, wherein said positive lens is a positive meniscus lens with a concave surface facing the eyepoint side of the eyepiece, and when a radius of curvature of said concave surface of said positive lens is r9 and an eye relief is de when an incident pupil position is oriented toward the object side of the eyepiece and at infinity, the following condition is met:

$$0 < de/|r9| < 0.18.$$

15. The eyepiece as defined in claim 11, wherein when a radius of curvature of an object-side surface of said biconvex lens is r1, the radius of curvature of the eyepoint-side surface of said biconvex lens is r2, the radius of curvature of the concave surface of said negative lens is r3, and a radius of curvature of an eyepoint-side surface of said positive lens is r9, the following conditions are met:

$$1.6 < r2/r3 < 2.0;$$

and $$0 < r1/r9 < 0.9.$$

16. The eyepiece as defined in claim 12, wherein when a radius of curvature of an object-side surface of said biconvex lens is r1, the radius of curvature of the eyepoint-side surface of said biconvex lens L1 is r2, the radius of curvature of the concave surface of said negative lens is r3, and said radius of curvature of said concave surface of said positive meniscus lens is r9, the following conditions are met:

$$1.6 < r2/r3 < 2.0;$$

and $$0 < r1/r9 < 0.9.$$

17. The eyepiece as defined in claim 10, and further comprising a positive plano-convex lens between said bonded negative meniscus lens and the eyepoint side of the eyepiece.

18. The eyepiece as defined in claim 17, wherein the plano-convex lens has a planar surface facing the eyepoint side of the eyepiece.

19. The eyepiece as defined in claim 11, wherein said positive lens is a plano-convex lens disposed between said bonded negative meniscus lens and the eyepoint side of the eyepiece.

20. The eyepiece as defined in claim 19, wherein the plano-convex lens has a planar surface facing the eyepoint side of the eyepiece.

* * * * *